(12) United States Patent
Nanjo et al.

(10) Patent No.: US 11,260,947 B2
(45) Date of Patent: Mar. 1, 2022

(54) OUTBOARD MOTOR AND MARINE VESSEL

(71) Applicant: YAMAHA HATSUDOKI KABUSHIKI KAISHA, Iwata (JP)

(72) Inventors: Morihiko Nanjo, Shizuoka (JP); Akihiro Onoue, Shizuoka (JP); Satoru Hamada, Shizuoka (JP); Kimitaka Saruwatari, Shizuoka (JP); Yuki Ikegaya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/996,952

(22) Filed: Aug. 19, 2020

(65) Prior Publication Data

US 2021/0053664 A1 Feb. 25, 2021

(30) Foreign Application Priority Data

Aug. 21, 2019 (JP) .............................. JP2019-151472

(51) Int. Cl.
*B63H 20/14* (2006.01)
*B63H 20/28* (2006.01)

(52) U.S. Cl.
CPC ............. *B63H 20/14* (2013.01); *B63H 20/28* (2013.01)

(58) Field of Classification Search
CPC .................................. B63H 20/14; B63H 20/28
See application file for complete search history.

(56) References Cited

U.S. PATENT DOCUMENTS

| | | | |
|---|---|---|---|
| 1,863,810 A | 6/1932 | Spencer | |
| 3,492,966 A * | 2/1970 | Carl | B63H 20/20 440/75 |
| 4,343,612 A | 8/1982 | Blanchard | |
| 9,896,177 B1 * | 2/2018 | Tuchscherer | F16H 63/304 |
| 2006/0213301 A1 | 9/2006 | Mizuguchi et al. | |
| 2009/0298361 A1 | 12/2009 | Nakamura et al. | |
| 2010/0144221 A1 | 6/2010 | Inaba | |
| 2017/0349256 A1 | 12/2017 | Nakamura | |
| 2018/0001983 A1 | 1/2018 | Mizutani | |

FOREIGN PATENT DOCUMENTS

| | | |
|---|---|---|
| EP | 2 336 020 A1 | 6/2011 |
| JP | 2004-211619 A | 7/2004 |
| JP | 2006-183694 A | 7/2006 |
| JP | 2007-008329 A | 1/2007 |
| JP | 2010-137646 A | 6/2010 |
| JP | 2012-144186 A | 8/2012 |
| JP | 2018-002004 A | 1/2018 |

OTHER PUBLICATIONS

Official Communication issued in corresponding European Patent Application No. 20185995.6, dated Feb. 1, 2021.

* cited by examiner

*Primary Examiner* — Stephen P Avila
(74) *Attorney, Agent, or Firm* — Keating and Bennett, LLP (57) ABSTRACT

An outboard motor includes an engine, a drive shaft, and a shift shaft disposed forward of the drive shaft. The shift shaft includes a first shift shaft that extends in an upward-downward direction, a second shift shaft disposed below the first shift shaft and spaced apart from and rearward of the first shift shaft, the second shift shaft extending in the upward-downward direction, and a shift force transmission to transmit, to the second shift shaft, a shift force applied to the first shift shaft.

16 Claims, 5 Drawing Sheets

FIG.1
FIRST PREFERRED EMBODIMENT

*FIG.4*
FORWARD DRIVE STATE (ENGINE DRIVE STATE)

*FIG.5*
REVERSE DRIVE STATE (ENGINE DRIVE STATE)

FIG.7
SECOND PREFERRED EMBODIMENT

OUTBOARD MOTOR AND MARINE VESSEL

CROSS REFERENCE TO RELATED APPLICATIONS

This application claims the benefit of priority to Japanese Patent Application No. 2019-151472 filed on Aug. 21, 2019. The entire contents of this application are hereby incorporated herein by reference.

BACKGROUND OF THE INVENTION

1. Field of the Invention

The present invention relates to an outboard motor including a shift shaft that switches the shift state of the outboard motor and a marine vessel.

2. Description of the Related Art

An outboard motor including a shift shaft that switches the shift state of the outboard motor is known in general. Such an outboard motor is disclosed in Japanese Patent Laid-Open No. 2004-211619, for example.

Japanese Patent Laid-Open No. 2004-211619 discloses an outboard motor including a drive shaft, a shift shaft that switches the shift state of the outboard motor, and a lower case. The shift shaft extends linearly in an upward-downward direction. The shift shaft is disposed forward of the drive shaft.

The lower end of the shift shaft is positioned in the vicinity of the front end of the lower case. The front end of the lower case (a portion of the lower case in the vicinity of the lower end of the shift shaft) is located at a position at which the front end is likely to be submerged when the outboard motor is tilted up (when an outboard motor body is tilted about a tilt shaft that extends in a right-left direction such that the lower end of the outboard motor body moves rearward). The outboard motor body is mounted on a hull by a bracket.

Although not clearly described in Japanese Patent Laid-Open No. 2004-211619, in general, an outboard motor is designed such that an outboard motor body is located rearward of a hull (tilt shaft) (is set back) in order to prevent submersion of a lower case when the outboard motor body is fully tilted up (when the outboard motor body is tilted about the tilt shaft that extends in a right-left direction such that the lower end of the outboard motor body moves to the rearmost position). Specifically, the outboard motor is designed such that the outboard motor body is easily moved above the water surface even with a slight rotation angle about the tilt shaft by securing a large distance from the tilt shaft to the outboard motor body in the radial direction of the tilt shaft in order to prevent submersion of the lower case. However, when the structure disclosed in Japanese Patent Laid-Open No. 2004-211619 is designed to prevent submersion as described above, the outboard motor body is disposed rearward of the hull (tilt shaft) such that the center of gravity of the outboard motor moves rearward farther away from the hull. Consequently, it is necessary to increase the mechanical strength of the bracket, and thus the size of the bracket increases such that the weight of the outboard motor (bracket) increases. Therefore, it is desired to significantly reduce or prevent an increase in the weight of the outboard motor (bracket).

SUMMARY OF THE INVENTION

Preferred embodiments of the present invention provide outboard motors and marine vessels that each prevent submersion during tilting up of the outboard motors while significantly reducing or preventing an increase in the weights of the outboard motors.

An outboard motor according to a preferred embodiment of the present invention includes an engine, a drive shaft to transmit a driving force from the engine to a propeller shaft that rotates together with a propeller, and a shift shaft disposed forward of the drive shaft to switch a shift state of the outboard motor. The shift shaft includes a first shift shaft that extends in an upward-downward direction of the outboard motor, a second shift shaft disposed below the first shift shaft and spaced apart from and rearward of the first shift shaft, the second shift shaft extending in the upward-downward direction, and a shift force transmission to transmit, to the second shift shaft, a shift force applied to the first shift shaft.

In an outboard motor according to a preferred embodiment of the present invention, the shift shaft includes the first shift shaft that extends in the upward-downward direction, the second shift shaft disposed below the first shift shaft and spaced apart from and rearward of the first shift shaft, the second shift shaft extending in the upward-downward direction, and the shift force transmission to transmit, to the second shift shaft, a shift force applied to the first shift shaft. Accordingly, unlike the related art, the first shift shaft, which is an upper portion of the shift shaft, is not disposed farther rearward of a hull (tilt shaft), but only the second shift shaft, which is a lower portion of the shift shaft, is disposed farther rearward. That is, in the outboard motor, only the second shift shaft located at a position which is likely to be submerged is partially disposed farther rearward of the hull (tilt shaft). Therefore, as compared with a case in which an entire outboard motor body is disposed farther rearward of the hull (tilt shaft) as in the related art, the center of gravity of the outboard motor is located closer to the hull. Consequently, submersion during tilting up of the outboard motor is prevented while an increase in the weight of the outboard motor is significantly reduced or prevented.

In an outboard motor according to a preferred embodiment of the present invention, the drive shaft preferably includes a first drive shaft that extends in the upward-downward direction, a second drive shaft disposed below the first drive shaft and spaced apart from and rearward of the first drive shaft, the second drive shaft extending in the upward-downward direction, and a driving force transmission to transmit, to the second drive shaft, a driving force applied to the first drive shaft. Accordingly, similarly to the shift shaft, the first drive shaft, which is an upper portion of the drive shaft, is not disposed farther rearward of the hull (tilt shaft), but only the second drive shaft, which is a lower portion of the drive shaft, is disposed farther rearward. Consequently, the entire drive shaft is prevented from being disposed farther rearward. Thus, the center of gravity of the outboard motor is located closer to the hull such that an increase in the weight of the outboard motor is effectively significantly reduced or prevented.

In such a case, the shift force transmission is preferably disposed below the driving force transmission. Accordingly, when the drive shaft is disposed in the vicinity of the shift shaft by design, the drive shaft and the shift shaft become less likely to interfere with each other. That is, the drive shaft is disposed farther forward (closer to the shift shaft), and thus the center of gravity of the outboard motor is located closer to the hull such that an increase in the weight of the outboard motor is more effectively significantly reduced or prevented.

In an outboard motor including the drive shaft including the first drive shaft, the second drive shaft, and the driving force transmission, a rearward separation distance of the second shift shaft from the first shift shaft is preferably equal or substantially equal to a rearward separation distance of the second drive shaft from the first drive shaft. Accordingly, a distance between the drive shaft and the shift shaft is kept substantially constant at any height. Therefore, as in a conventional case in which the drive shaft and the shift shaft extend linearly in the upward-downward direction, structures that are provided at the lower ends of the drive shaft and the shift shaft and switch the shift state of the outboard motor and structures that transmit a driving force are used without a change in design.

An outboard motor according to a preferred embodiment of the present invention preferably further includes a lower case that houses the propeller shaft, and an upper case disposed above the lower case, and the shift force transmission is preferably disposed in a vicinity of a boundary between the upper case and the lower case so as to be exposed when the upper case is separated from the lower case. Accordingly, the shift force transmission is disposed at a position which is exposed when the upper case and the lower case are separated from each other, and thus the shift force transmission is easily installed and maintained.

An outboard motor according to a preferred embodiment of the present invention preferably further includes an electric motor that rotates the propeller instead of the engine, and the electric motor is preferably disposed below the first shift shaft and forward of the second shift shaft on an extension of a central axis of the propeller shaft. Accordingly, a space secured by disposing the lower portion of the shift shaft rearward is effectively used as a space in which the electric motor is disposed. Furthermore, the electric motor is disposed coaxially with the propeller shaft, and thus the structure of the outboard motor is simplified as compared with a case in which the electric motor is offset from the central axis of the propeller shaft.

In such a case, a rearward separation distance of the second shift shaft from the first shift shaft is preferably larger than a length of the electric motor in a forward-rearward direction of the outboard motor. Accordingly, the front end of the outboard motor is likely prevented from being submerged when the outboard motor is tilted up due to the electric motor being disposed in the space secured by disposing the lower portion of the shift shaft rearward.

In an outboard motor including the drive shaft including the first drive shaft, the second drive shaft, and the driving force transmission, at least one of the shift force transmission and the driving force transmission preferably includes a plurality of spur gears aligned in a forward-rearward direction, and the plurality of spur gears of at least one of the shift force transmission and the driving force transmission preferably include an odd number of spur gears. Accordingly, the rotation directions of the first drive shaft and the second drive shaft (the rotation directions of the first shift shaft and the second shift shaft) are prevented from being reversed. That is, the rotation directions of the upper end and the lower end of the drive shaft (shift shaft) are the same. Therefore, as in a conventional case in which the drive shaft and the shift shaft extend linearly in the upward-downward direction, structures that are provided at the lower ends of the drive shaft and the shift shaft and switch the shift state of the outboard motor and structures that transmit a driving force are used without a change in design.

In an outboard motor according to a preferred embodiment of the present invention, the shift force transmission preferably includes a plurality of spur gears aligned in a forward-rearward direction, and the plurality of spur gears preferably include a plurality of sector gears in which teeth are only partially provided in a circumferential direction. Accordingly, as compared with a case in which the shift force transmission includes spur gears including circular teeth, the shift force transmission is downsized.

An outboard motor according to a preferred embodiment of the present invention preferably further includes a cylindrical steering shaft that extends in the upward-downward direction, and the first shift shaft is preferably disposed inside the cylindrical steering shaft. Accordingly, the first shift shaft is covered with the cylindrical steering shaft so as to be protected.

An outboard motor according to a preferred embodiment of the present invention preferably further includes a non-positive displacement water pump driven by the propeller shaft to pump seawater so as to cool the engine, and the non-positive displacement water pump is preferably disposed below the first shift shaft and forward of the second shift shaft on an extension of a central axis of the propeller shaft. Accordingly, the space secured by disposing the lower portion of the shift shaft rearward is effectively used as a space in which the non-positive displacement water pump is disposed.

In such a case, a rearward separation distance of the second shift shaft from the first shift shaft is preferably larger than a length of the non-positive displacement water pump in a forward-rearward direction. Accordingly, the front end of the outboard motor is likely prevented from being submerged when the outboard motor is tilted up due to the non-positive displacement water pump being disposed in the space secured by disposing the lower portion of the shift shaft rearward.

An outboard motor according to a preferred embodiment of the present invention preferably further includes a lower mount that supports a lower portion of an outboard motor body, and the shift force transmission is preferably disposed below the lower mount. Accordingly, the shift force transmission is disposed at a relatively low position. That is, in the upward-downward direction, only the lower portion of the shift shaft located in a relatively small height range is disposed rearward. Therefore, rearward movement of the center of gravity of the outboard motor is reduced or minimized, and thus an increase in the weight of the outboard motor is effectively significantly reduced or prevented.

An outboard motor including the drive shaft including the first drive shaft, the second drive shaft, and the driving force transmission preferably further includes a lower mount that supports a lower portion of an outboard motor body, and the driving force transmission is preferably disposed below the lower mount. Accordingly, the driving force transmission is disposed at a relatively low position. That is, only a lower portion of the drive shaft located in a relatively small height range is disposed rearward in an upward-downward direction. Therefore, rearward movement of the center of gravity of the outboard motor is reduced or minimized, and thus an increase in the weight of the outboard motor is effectively significantly reduced or prevented.

In an outboard motor including the drive shaft including the first drive shaft, the second drive shaft, and the driving force transmission, the first shift shaft is preferably disposed forward of the first drive shaft in a forward-rearward direction, and the second shift shaft is preferably disposed rearward of the first drive shaft in the forward-rearward direction. Accordingly, the drive shaft overlaps the shift shaft in the forward-rearward direction. Therefore, the drive shaft is disposed relatively close to the shift shaft in the forward-rearward direction, and thus rearward movement of the center of gravity of the outboard motor is reduced or minimized. Consequently, an increase in the weight of the outboard motor is effectively significantly reduced or prevented.

In an outboard motor including the drive shaft including the first drive shaft, the second drive shaft, and the driving force transmission, a distance between the shift force transmission and the driving force transmission in the upward-downward direction is preferably larger than a distance between the first shift shaft and the first drive shaft in a forward-rearward direction. Accordingly, a relatively large space is secured between the shift force transmission and the driving force transmission in the upward-downward direction, and thus it is used as a space in which various components such as the lower mount are disposed.

A marine vessel according to a preferred embodiment of the present invention includes a hull and an outboard motor mounted on the hull. The outboard motor includes an engine, a drive shaft to transmit a driving force from the engine to a propeller shaft that rotates together with a propeller, and a shift shaft disposed forward of the drive shaft to switch a shift state of the outboard motor. The shift shaft includes a first shift shaft that extends in an upward-downward direction, a second shift shaft disposed below the first shift shaft and spaced apart from and rearward of the first shift shaft, the second shift shaft extending in the upward-downward direction, and a shift force transmission to transmit, to the second shift shaft, a shift force applied to the first shift shaft.

In a marine vessel according to a preferred embodiment of the present invention, with the structure described above, submersion is prevented when the outboard motor is tilted up while an increase in the weight of the outboard motor is significantly reduced or prevented, similarly to the outboard motors according to preferred embodiments of the present invention described above.

In a marine vessel according to a preferred embodiment of the present invention, the drive shaft preferably includes a first drive shaft that extends in the upward-downward direction, a second drive shaft disposed below the first drive shaft and spaced apart from and rearward of the first drive shaft, the second drive shaft extending in the upward-downward direction, and a driving force transmission to transmit, to the second drive shaft, a driving force applied to the first drive shaft. Accordingly, similarly to the shift shaft, the first drive shaft, which is an upper portion of the drive shaft, is not disposed farther rearward of the hull (tilt shaft), but only the second drive shaft, which is a lower portion of the drive shaft, is disposed farther rearward. Consequently, the entire drive shaft is prevented from being disposed farther rearward. Thus, the center of gravity of the outboard motor is located closer to the hull such that an increase in the weight of the outboard motor is effectively significantly reduced or prevented.

In such a case, the shift force transmission is preferably disposed below the driving force transmission. Accordingly, when the drive shaft is disposed in the vicinity of the shift shaft by design, the drive shaft and the shift shaft become less likely to interfere with each other. That is, the drive shaft is disposed farther forward (closer to the shift shaft), and thus the center of gravity of the outboard motor is located closer to the hull such that an increase in the weight of the outboard motor is more effectively significantly reduced or prevented.

In a marine vessel including the drive shaft including the first drive shaft, the second drive shaft, and the driving force transmission, a rearward separation distance of the second shift shaft from the first shift shaft is preferably equal or substantially equal to a rearward separation distance of the second drive shaft from the first drive shaft. Accordingly, a distance between the drive shaft and the shift shaft is kept substantially constant at any height. Therefore, as in a conventional case in which the drive shaft and the shift shaft extend linearly in the upward-downward direction, structures that are provided at the lower ends of the drive shaft and the shift shaft and switch the shift state of the outboard motor and structures that transmit a driving force are used without a change in design.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a marine vessel 101 and an outboard motor 100 according to a first preferred embodiment of the present invention is now described with reference to FIGS. 1 to 6.

Figure 1:
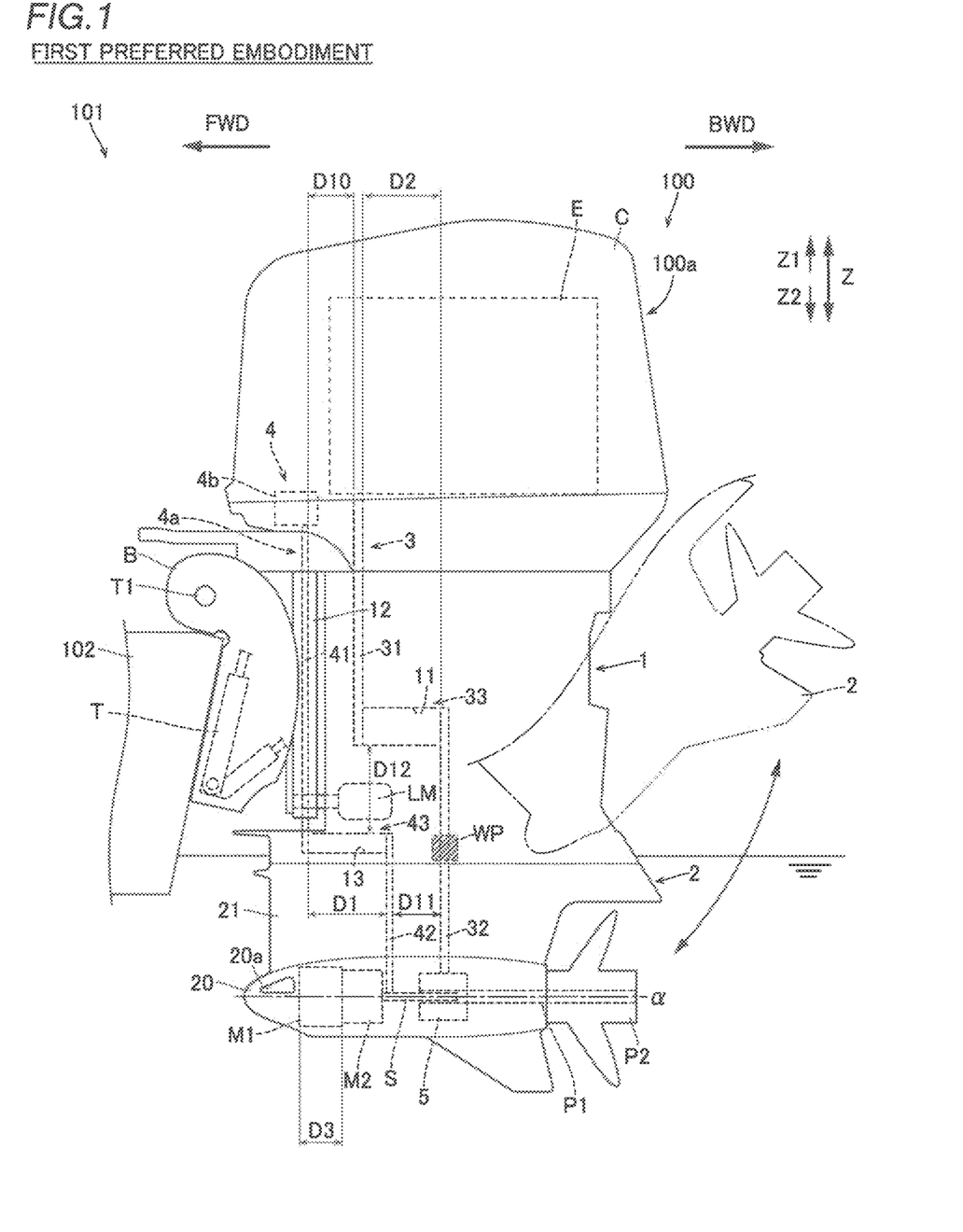
FIG. 1 is a side view schematically showing the overall structure of an outboard motor according to a first preferred embodiment of the present invention.

As shown in FIG. 1, the marine vessel 101 includes a hull 102 and the outboard motor 100 attached to a portion (rear portion) of the hull 102 in a BWD direction.

In the following description, the term "front (forward)" refers to the forward movement direction (a direction indicated by "FWD" in the figures) of the marine vessel 101, and the term "rear (rearward)" refers to a direction indicated by "BWD" in the figures. Furthermore, a "forward-rearward direction" refers to the forward-rearward direction of the marine vessel 101 (outboard motor 100) and a direction (a direction along the central axis α of a propeller shaft P1) parallel to the propeller shaft P1, for example. An "upward-downward direction" refers to the trim-tilt direction of the outboard motor 100, an "upward direction" refers to an "arrow Z1 direction", and a "downward direction" refers to an "arrow Z2 direction". A "right-left direction" refers to a direction perpendicular to the upward-downward direction and a direction perpendicular to the forward-rearward direction. A "horizontal direction" refers to a direction along a horizontal plane perpendicular to the upward-downward direction and a steering direction.

The outboard motor 100 includes a bracket B that fixes the outboard motor 100 to the hull 102, a trim-tilt device T provided on the bracket B, lower mounts LM, and upper mounts (not shown) provided on the bracket B.

The trim-tilt device T includes a cylinder, and rotates an outboard motor body 100a in the trim-tilt direction about a tilt shaft T1 that extends in the right-left direction by expanding and contracting the cylinder.

The lower mounts LM support a lower portion of the outboard motor body 100a (upper case 1) from the front side. The lower mounts LM are disposed in a lower portion of the upper case 1 in the upward-downward direction. Although not shown, the lower mounts LM (two in total) are spaced apart in the right-left direction so as to sandwich a shift shaft 4a from opposite sides in the right-left direction. The outboard motor body 100a in this description refers to an entire structure supported by the lower mounts LM and the upper mounts.

Figure 2:
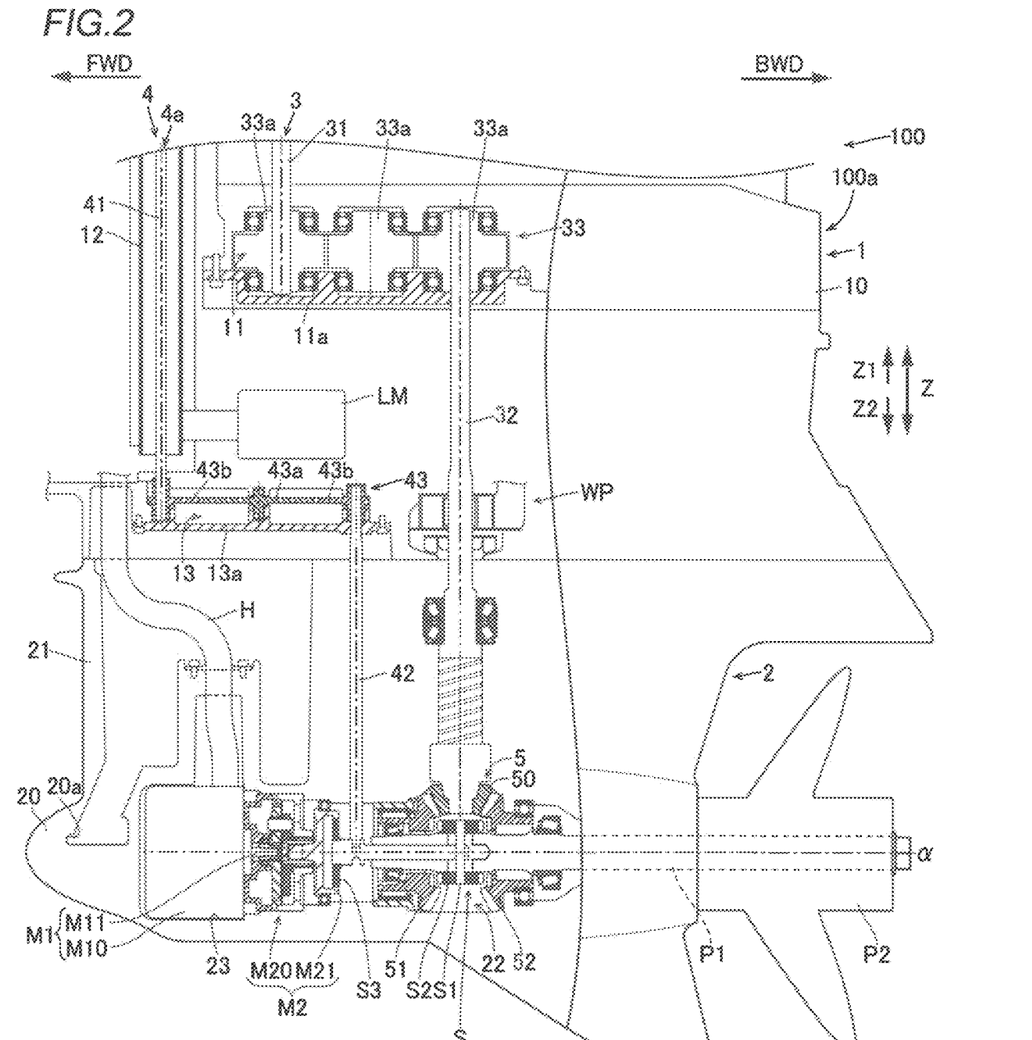
FIG. 2 is a partial sectional view showing the structure of the outboard motor according to the first preferred embodiment of the present invention.

The outboard motor 100 (outboard motor body 100a) further includes an engine E, an electric motor M1, the propeller shaft P1, a propeller P2, a motor driving force transmission M2, a cowling C, the upper case 1, a lower case 2, a drive shaft 3, a switch 4 including the shift shaft 4a, and a bevel gear unit 5.

The outboard motor 100 has three types of drive states. Specifically, the outboard motor 100 has three types of drive states including a "forward drive state" in which the propeller P2 is rotated by the driving force of the engine E to move the marine vessel 101 forward, a "reverse drive state" in which the propeller P2 is rotated by the driving force of the engine E to move the marine vessel 101 rearward, and a "motor drive state" in which the propeller P2 is rotated by the driving force of the electric motor M1 to move the marine vessel 101 (forward or rearward). The three types of drive states of the outboard motor 100 are switched by the switch 4.

The shift shaft 4a according to the first preferred embodiment bends halfway in the upward-downward direction, and a lower portion (second shift shaft 42 described below) thereof is spaced apart from and rearward of an upper portion (first shift shaft 41 described below). The details are described below. The structure of each portion of the outboard motor 100 is now described.

The engine E is an internal combustion engine that generates a driving force by combustion of fuel.

The engine E is disposed in the uppermost portion of the outboard motor body 100a. The engine E is connected to the upper end of the drive shaft 3 that extends in the upward-downward direction, and rotates the drive shaft 3 by the generated driving force (torque). Consequently, the engine E rotates the propeller P2 together with the propeller shaft P1.

Instead of the engine E (see FIG. 1), the electric motor M1 shown in FIG. 2 is able to rotate the propeller P2. Electric power is supplied to the electric motor M1 via wiring H. The wiring H is connected to the electric motor M1 via a water passage (not shown) provided in the lower case 2. Cooling water (water to cool each portion of the outboard motor 100) pumped by a water pump WP flows through the water passage (not shown). The water pump WP is preferably a positive-displacement water pump. The water pump WP is installed on the drive shaft 3 (second drive shaft 32), and rotates together with the drive shaft 3.

The electric motor M1 includes a motor body M10 including a stator and a rotor, and a motor shaft M11 that functions as an output shaft that outputs the generated driving force (torque) to the outside.

The electric motor M1 is disposed on an extension of the central axis α of the propeller shaft P1. That is, the motor shaft M11 is disposed coaxially with the central axis α of the propeller shaft P1. The electric motor M1 is disposed below (immediately below) the first shift shaft 41 and forward of the second shift shaft 42. The motor body M10 (electric motor M1) is disposed in a motor chamber 23 provided in the lower case 2. The motor chamber 23 is watertight.

The propeller P2 is attached to the rear end of the propeller shaft P1, and is rotated integrally with the propeller shaft P1. The propeller shaft P1 is disposed in the lower case 2 and is disposed in an internal space chamber 22 positioned adjacent to the rear of the motor chamber 23. The rear of the internal space chamber 22 is open so as to be able to house the propeller shaft P1, and extends in the forward-rearward direction along the central axis α of the propeller shaft P1. The motor chamber 23 that houses the electric motor M1 is disposed adjacent to the front of the internal space chamber 22.

The motor driving force transmission M2 transmits the driving force of the electric motor M1 to the propeller shaft P1 when the drive state of the outboard motor 100 is the "motor drive state". The motor driving force transmission M2 is disposed between the propeller shaft P1 and the electric motor M1 in the forward-rearward direction. A slider S (slide shifter), which is described below, of the switch 4 is disposed between the motor driving force transmission M2 and the propeller shaft P1.

The motor driving force transmission M2 includes a planetary gear unit M20 rotated by the electric motor M1 (motor shaft M11) and an engaged portion M21 provided at the rear end of the planetary gear unit M20.

The engaged portion M21 engages with (meshes with) a motor clutch S3 of the slider S that moves in the forward-rearward direction at the time of shift switching, and rotates integrally with the motor clutch S3 (slider S). Thus, the propeller shaft P1 is rotated via the slider S. The slider S is a shaft that extends in the forward-rearward direction.

The cowling C (see FIG. 1) is disposed in the uppermost portion of the outboard motor 100. The cowling C houses the engine E (see FIG. 1) and an electric actuator 4b, which is described below, of the switch 4. Therefore, the upper end of (a first drive shaft 31 described below of) the drive shaft 3 and the upper end of (the first shift shaft 41 described below of) the shift shaft 4a are positioned inside the cowling C.

As shown in FIG. 2, the upper case 1 is disposed above the lower case 2 and below the cowling C. The upper case 1 is divided into a plurality of members (a plurality of upper pieces), and is configured by assembling the plurality of upper pieces with each other.

A driving force transmission 33, which is described below, of the drive shaft 3 is disposed (mounted) inside a predetermined upper piece 10 disposed at a substantially intermediate height in the upward-downward direction among the plurality of upper pieces. Therefore, the driving force transmission 33 is positioned at the substantially intermediate height of the upper piece 10 in the upward-downward direction.

The predetermined upper piece 10 has an elongated shape, the longitudinal direction of which is the forward-rearward direction as viewed in the right-left direction. The thickness of the predetermined upper piece 10 in the upward-downward direction is substantially constant as viewed in the right-left direction.

The driving force transmission 33 is attached to the predetermined upper piece 10 from below. Specifically, the upper case 1 (predetermined upper piece 10) includes a driving force transmission housing chamber 11 that houses the driving force transmission 33. The driving force transmission housing chamber 11 includes recesses that are recessed upward from the lower end of the predetermined upper piece 10 and a lid 11a that closes the recesses.

A shift force transmission 43 is attached to the upper case 1 from below. Specifically, a shift force transmission housing chamber 13 that houses the shift force transmission 43 is provided at the lower end of the upper case 1. The shift force transmission housing chamber 13 includes recesses that are recessed upward from the lower end of the upper case 1 and a lid 13a that closes the recesses.

A cylindrical steering shaft 12 that extends in the upward-downward direction is provided in a front portion of the upper case 1. The steering shaft 12 functions as a central axis about which the outboard motor 100 is rotated (turned) in the horizontal direction (steering direction) in order to change the traveling direction of the marine vessel 101. The lower end of the steering shaft 12 is positioned above a boundary between the upper case 1 and the lower case 2.

The lower case 2 houses the propeller shaft P1 and the electric motor M1. The lower end of (the second drive shaft 32 described below of) the drive shaft 3 and the lower end of (the second shift shaft 42 described below of) the shift shaft 4a are positioned inside the lower case 2.

The lower case 2 includes a streamlined torpedo-shaped portion 20 that extends in the forward-rearward direction, and an upper portion 21 that is connected to the torpedo-shaped portion 20 from above and is thin in the right-left direction. The torpedo-shaped portion 20 includes an intake port 20a at the tip thereof, and cooling water that flows through a water passage (not shown) is taken in via the intake port 20a.

As described above, the lower case 2 includes the motor chamber 23 in which the motor body M10 is disposed (housed), and the internal space chamber 22 in which the propeller shaft P1, the bevel gear unit 5, and the motor driving force transmission M2 are disposed (housed).

The drive shaft 3 transmits the driving force of the engine E (see FIG. 1) to the propeller shaft P1 that rotates together with the propeller P2. Although not shown, the drive shaft 3 is disposed at an intermediate position of the outboard motor 100 in the right-left direction (the same applies to the shift shaft 4a and the propeller shaft P1).

The drive shaft 3 includes the first drive shaft 31 that extends in the upward-downward direction, the second drive shaft 32 that is disposed below the first drive shaft 31, is spaced apart from and rearward of the first drive shaft 31, and extends in the upward-downward direction, and the driving force transmission 33 to transmit, to the second drive shaft 32, a driving force applied to the first drive shaft 31.

The upper end of the first drive shaft 31 is positioned inside the cowling C. The lower end of the first drive shaft 31 is positioned inside the predetermined upper piece 10 of the upper case 1. In the forward-rearward direction, the first drive shaft 31 is disposed forward of the propeller shaft P1. The first drive shaft 31 is disposed above the lower mounts LM.

The driving force transmission 33 includes a plurality of circular spur gears 33a aligned in the forward-rearward direction and in the horizontal direction. The plurality of spur gears 33a mesh with each other, and transmit a driving force from the front spur gear 33a to the rear spur gear 33a. The spur gear 33a at the front end is fixed to the lower end of the first drive shaft 31. The spur gear 33a at the rear end is fixed to the upper end of the second drive shaft 32.

An odd number of spur gears 33a are provided for the outboard motor 100. For example, three spur gears 33a are provided for the outboard motor 100. Furthermore, the plurality of (three) spur gears 33a rotate about a central axis that extends in the upward-downward direction. That is, in the drive shaft 3, the rotation direction of the first drive shaft 31 and the rotation direction of the second drive shaft 32 are the same.

The upper end of the second drive shaft 32 is disposed inside the predetermined upper piece 10 of the upper case 1. The lower end of the second drive shaft 32 is disposed inside the internal space chamber 22 of the lower case 2.

An intermediate bevel gear 50 (a bevel gear disposed between a front bevel gear 51 and a rear bevel gear 52 in the forward-rearward direction), described below, of the bevel gear unit 5 is fixed to the lower end of the second drive shaft 32.

The switch 4 includes the shift shaft 4a that is disposed forward of the drive shaft 3 and switches the shift state of the outboard motor 100, the electric actuator 4b that rotates the shift shaft 4a (moves the slider S in the forward-rearward direction), and the slider S that moves in the forward-rearward direction as the shift shaft 4a rotates.

The shift shaft 4a includes the first shift shaft 41 that extends in the upward-downward direction, the second shift shaft 42 that is located below the first shift shaft 41, is spaced apart from and rearward of the first shift shaft 41, and extends in the upward-downward direction, and the shift force transmission 43 to transmit a shift force applied to the first shift shaft 41 to the second shift shaft 42.

The shift shaft 4a (excluding the upper end and the lower end) is disposed inside the cylindrical steering shaft 12 that extends in the upward-downward direction (is inserted in the steering shaft 12).

The upper end of the first shift shaft 41 is disposed inside the cowling C, and the electric actuator 4b is installed therein. The lower end of the first shift shaft 41 is disposed inside the upper case 1. The lower end of the first shift shaft 41 is disposed in the vicinity of the boundary between the upper case 1 and the lower case 2.

The shift force transmission 43 includes a plurality of sector gears (43a and 43b) aligned in the forward-rearward direction and in the horizontal direction. The sector gears are a type of spur gears, and are gears in which teeth are only partially provided in the circumferential direction (rotation direction). The plurality of sector gears mesh with each other, and transmit a shift force from the front sector gear to the rear sector gear. The sector gear at the front end is fixed to the lower end of the first shift shaft 41. The sector gear at the rear end is fixed to the upper end of the second shift shaft 42.

An odd number of sector gears are provided for the outboard motor 100. For example, three sector gears are provided for the outboard motor 100. Furthermore, the plurality of (three) sector gears rotate about a central axis that extends in the upward-downward direction. That is, in the shift shaft 4a, the rotation direction of the first shift shaft 41 and the rotation direction of the second shift shaft 42 are the same.

Figure 3:
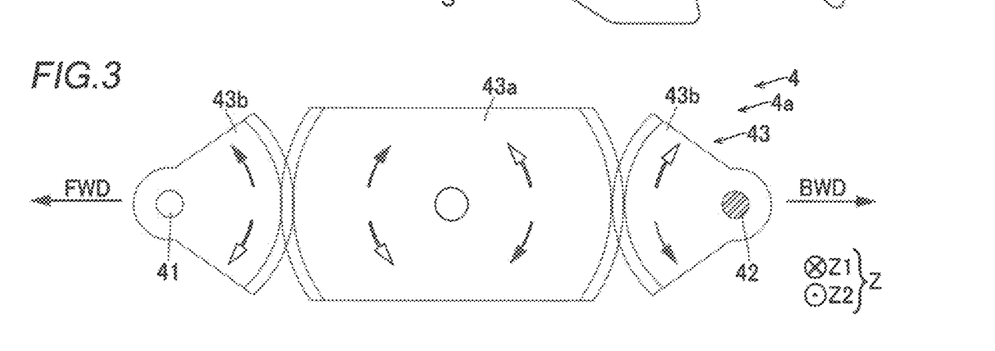
FIG. 3 is a bottom view showing a plurality of gears of a shift force transmission of a shift shaft according to the first preferred embodiment of the present invention.

As shown in FIG. 3, the plurality of (three) sector gears include one elliptical gear 43a having a generally oval shape (a shape defined by a pair of parallel straight portions and a pair of arcuate portions) and a pair of (two) fan-shaped gears 43b disposed forward of and rearward of the elliptical gear 43a. Note that the lengths of the shift force transmission 43 in the right-left direction and the forward-rearward direction are smaller due to the elliptical gear 43a and the fan-shaped gears 43b as compared with a case in which the shift force transmission 43 includes a plurality of circular gears. Both the elliptical gear 43a and the fan-shaped gear 43b are examples of a "spur gear" and a "sector gear".

As shown in FIG. 2, the shift force transmission 43 is disposed in the vicinity of the boundary between the upper case 1 and the lower case 2 so as to be exposed when the upper case 1 and the lower case 2 are separated from each other.

Specifically, the shift force transmission 43 is exposed as described above when the upper case 1 and the lower case 2 are separated from each other. When the upper case 1 and the lower case 2 are separated from each other, the shift force transmission 43 is not visually recognized until the lid 13a is removed.

The upper end of the second shift shaft 42 is positioned inside the upper case 1. The lower end of the second shift shaft 42 is positioned inside the internal space chamber 22 of the lower case 2.

The slider S is mounted at the lower end of the second shift shaft 42.

The first shift shaft 41 is disposed forward of the first drive shaft 31 in the forward-rearward direction. The second shift shaft 42 is disposed rearward of the first drive shaft 31 in the forward-rearward direction. That is, the first drive shaft 31 is disposed between the first shift shaft 41 and the second shift shaft 42 in the forward-rearward direction. Therefore, as viewed in the upward-downward direction, a rear portion of the shift force transmission 43 overlaps a front portion of the driving force transmission 33.

The shift force transmission 43 is disposed below the driving force transmission 33. Furthermore, the shift force transmission 43 is disposed below the lower mounts LM.

As shown in FIG. 1, the rearward separation distance D1 of the second shift shaft 42 from the first shift shaft 41 is equal or substantially equal to the rearward separation distance D2 of the second drive shaft 32 from the first drive shaft 31. Furthermore, the rearward separation distance D1 of the second shift shaft 42 from the first shift shaft 41 is larger than the length D3 of the electric motor M1 in the forward-rearward direction.

Before the structure of the slider S of the switch 4 is described with reference to FIG. 2, the structure of the bevel gear unit 5 is described.

The bevel gear unit 5 includes three gears including the intermediate bevel gear 50, the front bevel gear 51, and the rear bevel gear 52.

The intermediate bevel gear 50 constantly meshes (engages) with the front bevel gear 51 and the rear bevel gear 52. The intermediate bevel gear 50 is fixed to the lower end of the second drive shaft 32. The front bevel gear 51 is disposed forward of the intermediate bevel gear 50. The rear bevel gear 52 is disposed rearward of the intermediate bevel gear 50.

The intermediate bevel gear 50 functions as a drive gear that drives the front bevel gear 51 and the rear bevel gear 52.

That is, the front bevel gear 51 and the rear bevel gear 52 function as driven gears of the intermediate bevel gear 50. The front bevel gear 51 and the rear bevel gear 52 rotate about the central axis α of the propeller shaft P1. The rotation directions of the front bevel gear 51 and the rear bevel gear 52 are opposite to each other.

The switch 4 switches between three drive states including a "forward drive state", a "reverse drive state", and a "motor drive state" by moving the slider S in the forward-rearward direction.

In the "forward drive state" and the "reverse drive state", the engine E (see FIG. 1) rotates the propeller P2, and in the "motor drive state", the electric motor M1 rotates the propeller P2.

The slider S is a shaft disposed in the internal space chamber 22 and extending in the forward-rearward direction. The rear end of the slider S is connected to the propeller shaft P1 so as to be movable in a predetermined range in the forward-rearward direction with respect to the propeller shaft P1. The slider S moves forward when the shift shaft 4a rotates in a predetermined direction. Furthermore, the slider S moves rearward when the shift shaft 4a rotates in a direction opposite to the predetermined direction.

The slider S includes a connector S1 provided in the vicinity of the rear end of the slider S, drive clutches S2 provided at the rear end of the slider S, and a motor clutch S3 provided at the front end of the slider S.

The connector S1 connects the slider S to the propeller shaft P1. The connector S1 is a shaft that extends in a direction perpendicular to the forward-rearward direction. The connector S1 penetrates an elongated hole that extends in the forward-rearward direction of the propeller shaft P1.

The drive clutches S2 are provided at both ends of the connector S1. The drive clutches S2 are dog clutches, for example.

Figure 4:
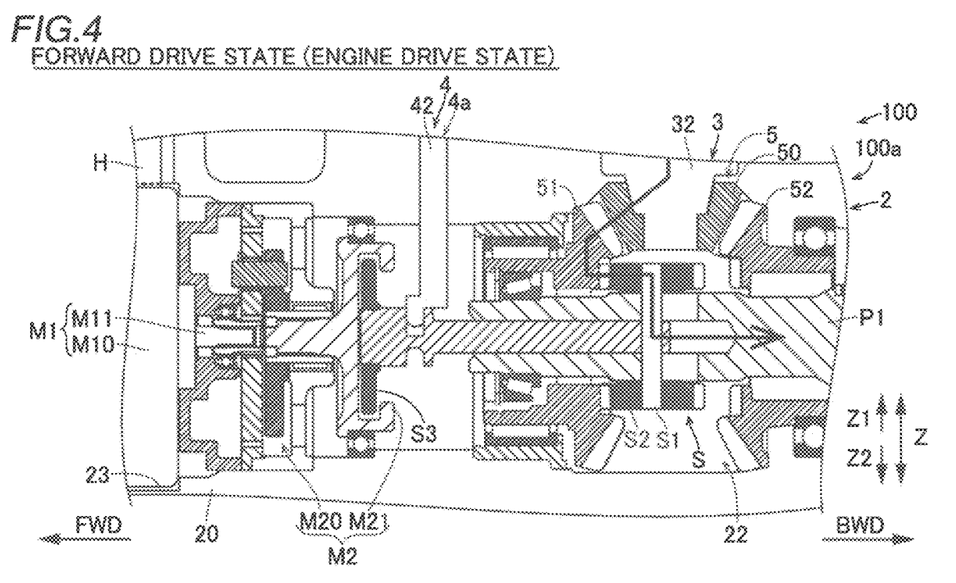
FIG. 4 is a partially enlarged view showing the inside of a lower case in a forward drive state by an engine of the outboard motor according to the first preferred embodiment of the present invention.

As shown in FIG. 4, when the slider S moves forward, the drive clutches S2 move forward together with the slider S and engage with the front bevel gear 51 from the rear. Consequently, the drive state of the outboard motor 100 becomes the "forward drive state". In short, a driving force is transmitted from the drive shaft 3 to the propeller shaft P1 via a path that passes through the front bevel gear 51. In such a case, the motor clutch S3 does not engage with the engaged portion M21 of the planetary gear unit M20.

Figure 5:
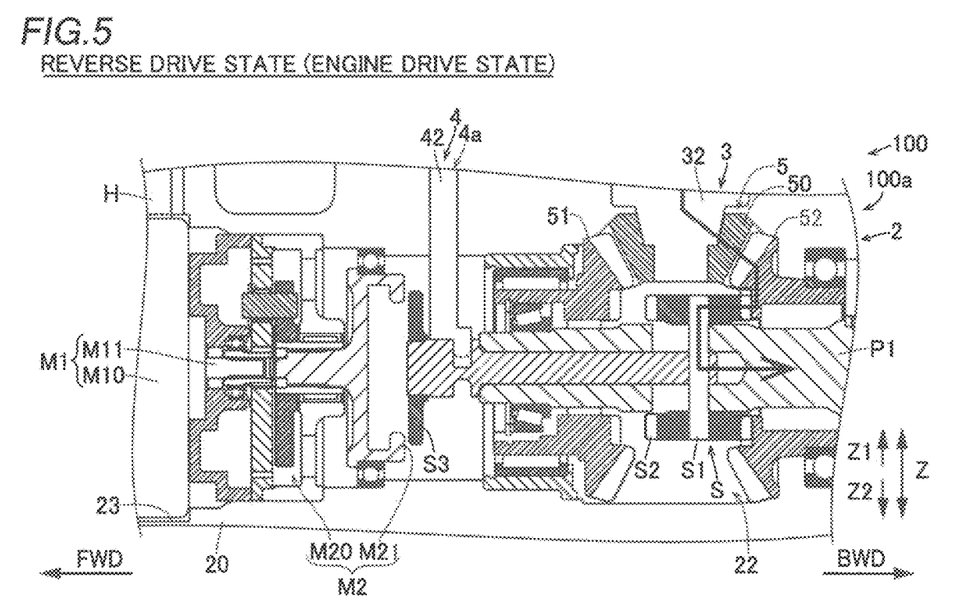
FIG. 5 is a partially enlarged view showing the inside of the lower case in a reverse drive state by the engine of the outboard motor according to the first preferred embodiment of the present invention.

As shown in FIG. 5, when the slider S moves rearward, the drive clutches S2 move rearward together with the slider S and engage with the rear bevel gear 52 from the front. Consequently, the drive state of the outboard motor 100 becomes the "reverse drive state". In short, a driving force is transmitted from the drive shaft 3 to the propeller shaft P1 via a path that passes through the rear bevel gear 52. In such a case, the motor clutch S3 does not engage with the engaged portion M21 of the planetary gear unit M20.

Figure 6:
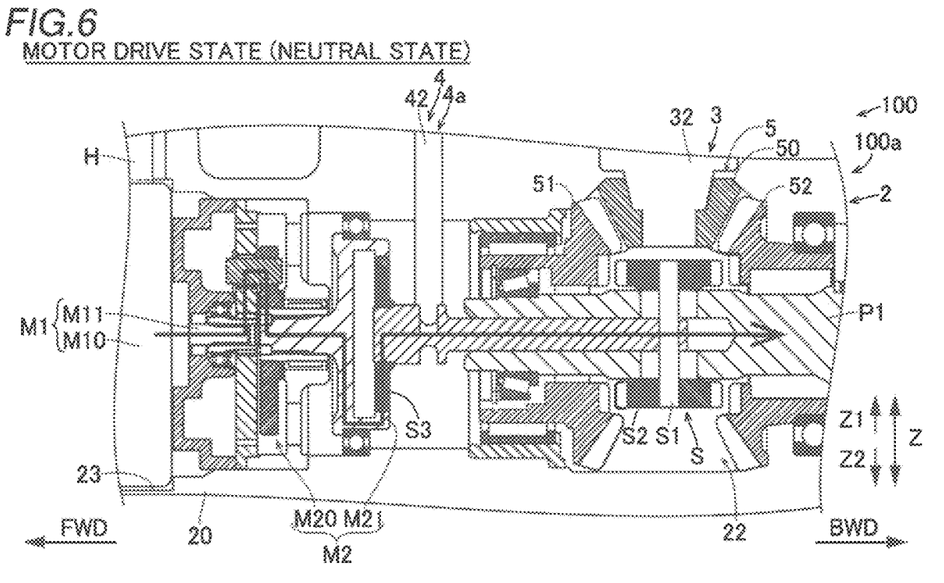
FIG. 6 is a partially enlarged view showing the inside of the lower case in a motor drive state by an electric motor of the outboard motor according to the first preferred embodiment of the present invention.

As shown in FIG. 6, the drive clutches S2 do not engage with either the front bevel gear 51 or the rear bevel gear 52 when the drive clutches S2 are located at intermediate positions (neutral positions) between positions at which the drive clutches S2 engage with the front bevel gear 51 and positions at which the drive clutches S2 engage with the rear bevel gear 52. In such a case, the motor clutch S3 engages with the engaged portion M21 provided at the rear end of the planetary gear unit M20. Consequently, the drive state of the outboard motor 100 becomes the "motor drive state". In short, a driving force is transmitted from the electric motor M1 to the propeller shaft P1 via a path that passes through the planetary gear unit M20.

According to the first preferred embodiment of the present invention, the following advantageous effects are achieved.

According to the first preferred embodiment of the present invention, the shift shaft 4a includes the first shift shaft 41 that extends in the upward-downward direction, the second shift shaft 42 that is disposed below the first shift shaft 41, is spaced apart from and rearward of the first shift shaft 41, and extends in the upward-downward direction, and the shift force transmission 43 to transmit, to the second shift shaft 42, a shift force applied to the first shift shaft 41. Accordingly, unlike the related art, the first shift shaft 41, which is an upper portion of the shift shaft 4a, is not disposed farther rearward of the hull 102 (tilt shaft), but only the second shift shaft 42, which is a lower portion of the shift shaft 4a, is disposed farther rearward. That is, in the outboard motor 100, only the second shift shaft 42 located at a position which is likely to be submerged is partially disposed farther rearward of the hull 102 (tilt shaft). Therefore, as compared with a case in which the entire outboard motor body 100a is disposed farther rearward of the hull 102 (tilt shaft) as in the related art, the center of gravity of the outboard motor 100 is located closer to the hull 102. Consequently, submersion during tilting up of the outboard motor 100 is prevented while an increase in the weight of the outboard motor 100 is significantly reduced or prevented.

According to the first preferred embodiment of the present invention, the drive shaft 3 includes the first drive shaft 31 that extends in the upward-downward direction, the second drive shaft 32 that is disposed below the first drive shaft 31, is spaced apart from and rearward of the first drive shaft 31, and extends in the upward-downward direction, and the driving force transmission 33 to transmit, to the second drive shaft 32, a driving force applied to the first drive shaft 31. Accordingly, similarly to the shift shaft 4a, the first drive shaft 31, which is an upper portion of the drive shaft 3, is not disposed farther rearward of the hull 102 (tilt shaft), but only the second drive shaft 32, which is a lower portion of the drive shaft 3, is disposed farther rearward. Consequently, the entire drive shaft 3 is prevented from being disposed farther rearward. Thus, the center of gravity of the outboard motor 100 is located closer to the hull 102 such that an increase in the weight of the outboard motor 100 is effectively significantly reduced or prevented.

According to the first preferred embodiment of the present invention, the shift force transmission 43 is disposed below the driving force transmission 33. Accordingly, when the drive shaft 3 is disposed in the vicinity of the shift shaft 4a by design, the drive shaft 3 and the shift shaft 4a become less likely to interfere with each other. That is, the drive shaft 3 is disposed farther forward (closer to the shift shaft 4a), and thus the center of gravity of the outboard motor 100 is located closer to the hull 102 such that an increase in the weight of the outboard motor 100 is more effectively significantly reduced or prevented.

According to the first preferred embodiment of the present invention, the rearward separation distance D1 of the second shift shaft 42 from the first shift shaft 41 is equal or substantially equal to the rearward separation distance D2 of the second drive shaft 32 from the first drive shaft 31. Accordingly, a distance between the drive shaft 3 and the shift shaft 4a is kept substantially constant at any height. Therefore, as in a conventional case in which the drive shaft 3 and the shift shaft 4a extend linearly in the upward-downward direction, structures that are provided at the lower ends of the drive shaft 3 and the shift shaft 4a and switch the shift state of the outboard motor 100 and structures that transmit a driving force are used without a change in design.

According to the first preferred embodiment of the present invention, the outboard motor 100 includes the lower case 2 that houses the propeller shaft P1 and the upper case 1 disposed above the lower case 2, and the shift force transmission 43 is disposed in the vicinity of the boundary between the upper case 1 and the lower case 2 so as to be exposed when the upper case 1 is separated from the lower case 2. Accordingly, the shift force transmission 43 is disposed at a position which is exposed when the upper case 1 and the lower case 2 are separated from each other, and thus the shift force transmission 43 is easily installed and maintained.

According to the first preferred embodiment of the present invention, the outboard motor 100 includes the electric motor M1 that rotates the propeller P2 instead of the engine E, and the electric motor M1 is disposed below the first shift shaft 41 and forward of the second shift shaft 42 on the extension of the central axis α of the propeller shaft P1. Accordingly, a space secured by disposing the lower portion of the shift shaft 4a rearward is effectively used as a space in which the electric motor M1 is disposed. Furthermore, the electric motor M1 is disposed coaxially with the propeller shaft P1, and thus the structure of the outboard motor 100 is simplified as compared with a case in which the electric motor M1 is offset from the central axis α of the propeller shaft P1.

According to the first preferred embodiment of the present invention, the rearward separation distance D1 of the second shift shaft 42 from the first shift shaft 41 is larger than the length D3 of the electric motor M1 in the forward-rearward direction. Accordingly, the front end of the outboard motor 100 is likely prevented from being submerged when the outboard motor 100 is tilted up due to the electric motor M1 being disposed in the space secured by disposing the lower portion of the shift shaft 4a rearward.

According to the first preferred embodiment of the present invention, the driving force transmission 33 (shift force transmission 43) includes the plurality of spur gears 33a (elliptical gear 43a and fan-shaped gears 43b) aligned in the forward-rearward direction, and the plurality of spur gears 33a (elliptical gear 43a and fan-shaped gears 43b) of the driving force transmission 33 (shift force transmission 43) include an odd number of spur gears 33a (elliptical gear 43a and fan-shaped gears 43b). Accordingly, the rotation directions of the first drive shaft 31 and the second drive shaft 32 (the rotation directions of the first shift shaft 41 and the second shift shaft 42) are prevented from being reversed. That is, the rotation directions of the upper end and the lower end of the drive shaft 3 (shift shaft 4a) are the same. Therefore, as in a conventional case in which the drive shaft 3 and the shift shaft 4a extend linearly in the upward-downward direction, structures that are provided at the lower ends of the drive shaft 3 and the shift shaft 4a and switch the shift state of the outboard motor 100 and structures that transmit a driving force are used without a change in design.

According to the first preferred embodiment of the present invention, the shift force transmission 43 includes the plurality of spur gears (elliptical gear 43a and fan-shaped gears 43b) aligned in the forward-rearward direction, and the plurality of spur gears include the plurality of sector gears in which teeth are only partially provided in the circumferential direction. Accordingly, as compared with a case in which the shift force transmission 43 includes spur gears including circular teeth, the shift force transmission 43 is downsized.

According to the first preferred embodiment of the present invention, the outboard motor 100 includes the cylindrical steering shaft 12 that extends in the upward-downward direction, and the first shift shaft 41 is disposed inside the steering shaft 12. Accordingly, the first shift shaft 41 is covered with the cylindrical steering shaft 12 so as to be protected.

According to the first preferred embodiment of the present invention, the outboard motor 100 includes the lower mounts LM that support the lower portion of the outboard motor body 100a, and the shift force transmission 43 is disposed below the lower mounts LM. Accordingly, the shift force transmission 43 is disposed at a relatively low position. That is, in the upward-downward direction, only the lower portion of the shift shaft 4a located in a relatively small height range is disposed rearward. Therefore, rearward movement of the center of gravity of the outboard motor 100 is reduced or minimized, and thus an increase in the weight of the outboard motor 100 is effectively significantly reduced or prevented.

According to the first preferred embodiment of the present invention, the first shift shaft 41 is disposed forward of the first drive shaft 31 in the forward-rearward direction, and the second shift shaft 42 is disposed rearward of the first drive shaft 31 in the forward-rearward direction. Accordingly, the drive shaft 3 overlaps the shift shaft 4a in the forward-rearward direction. Therefore, the drive shaft 3 is disposed relatively close to the shift shaft 4a in the forward-rearward direction, and thus rearward movement of the center of gravity of the outboard motor 100 is reduced or minimized. Consequently, an increase in the weight of the outboard motor 100 is effectively significantly reduced or prevented.

According to the first preferred embodiment of the present invention, the distance between the shift force transmission 43 and the driving force transmission 33 in the upward-downward direction is larger than the distance between the first shift shaft 41 and the first drive shaft 31 in the forward-rearward direction. Accordingly, a relatively large space is secured between the shift force transmission 43 and the driving force transmission 33 in the upward-downward direction, and thus it is used as a space in which various components such as the lower mounts are disposed.

Second Preferred Embodiment

Figure 7:
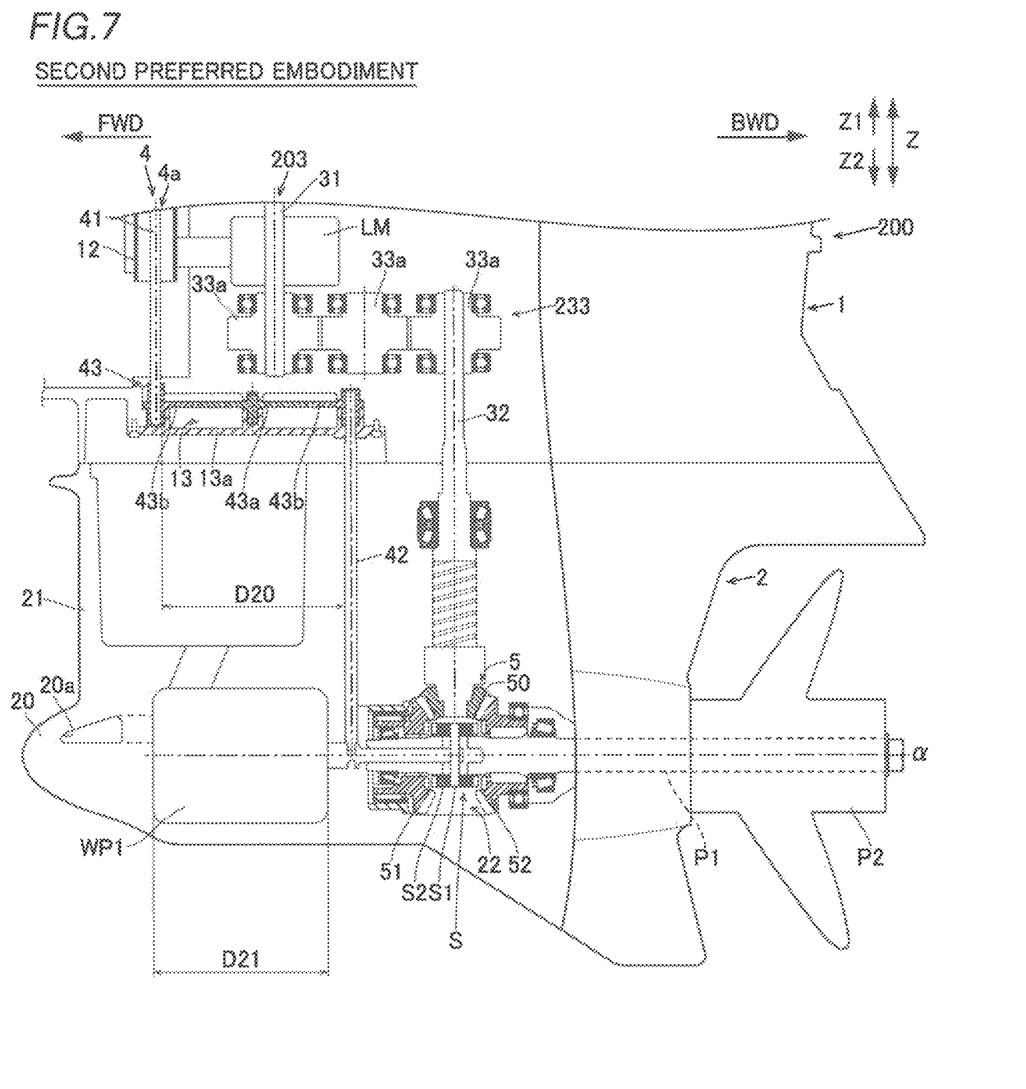
FIG. 7 is a partial sectional view showing the structure of an outboard motor according to a second preferred embodiment of the present invention.

The structure of an outboard motor 200 according to a second preferred embodiment of the present invention is now described with reference to FIG. 7. In the second preferred embodiment, a driving force transmission 233 of a drive shaft 203 is disposed below the lower mounts LM, unlike the first preferred embodiment in which the drive force transmission 33 of the drive shaft 3 is disposed above the lower mounts LM. The outboard motor 200 according to the second preferred embodiment also differs from the outboard motor 100 according to the first preferred embodiment in that the outboard motor 200 does not include an electric motor. In the second preferred embodiment, the same or similar structures as those of the first preferred embodiment are denoted by the same reference numerals, and description thereof is omitted.

The outboard motor 200 according to the second preferred embodiment includes the drive shaft 203 and a water pump WP1.

The drive shaft 203 includes the driving force transmission 233.

The driving force transmission 233 is disposed below the lower mounts LM. A front portion of the driving force transmission 233 is disposed immediately below the lower mounts LM. In addition, the driving force transmission 233 is disposed above the shift force transmission 43. The driving force transmission 233 is disposed adjacent to or in the vicinity of the shift force transmission 43.

The water pump WP1 is preferably a non-positive displacement water pump driven by a propeller shaft P1 to pump seawater so as to cool an engine. The water pump WP1 is disposed on an extension of the central axis α of the propeller shaft P1. The water pump WP1 is disposed below a first shift shaft 41 and forward of a second shift shaft 42. The water pump WP1 is directly installed at the front end of the propeller shaft P1, and is driven by the torque (driving force) of the propeller shaft P1. A rearward separation distance D20 of the second shift shaft 42 from the first shift shaft 41 is larger than the length D21 of the water pump WP1 in a forward-rearward direction.

According to the second preferred embodiment of the present invention, the following advantageous effects are achieved.

According to the second preferred embodiment of the present invention, similarly to the first preferred embodiment described above, submersion during tilting up of the outboard motor 200 is prevented while an increase in the weight of the outboard motor 200 is significantly reduced or prevented.

According to the second preferred embodiment of the present invention, the outboard motor 200 includes the non-positive displacement water pump WP1 driven by the propeller shaft P1 to pump seawater so as to cool the engine E, and the water pump WP1 is disposed below the first shift shaft 41 and forward of the second shift shaft 42 on the extension of the central axis α of the propeller shaft P1. Accordingly, a space secured by disposing a lower portion of a shift shaft 4a rearward is effectively used as a space in which the water pump WP1 is disposed.

According to the second preferred embodiment of the present invention, the rearward separation distance D20 of the second shift shaft 42 from the first shift shaft 41 is larger than the length D21 of the water pump WP1 in the forward-rearward direction. Accordingly, the front end of the outboard motor 200 is likely prevented from being submerged when the outboard motor 200 is tilted up due to the water pump WP1 being disposed in the space secured by disposing the lower portion of the shift shaft 4a rearward.

According to the second preferred embodiment of the present invention, the outboard motor 200 includes the lower mounts LM that support a lower portion of an outboard motor body, and the driving force transmission 233 is disposed below the lower mounts LM. Accordingly, the driving force transmission 233 is disposed at a relatively low position. That is, only a lower portion of the drive shaft 203 located in a relatively small height range is disposed rearward in an upward-downward direction. Therefore, rearward movement of the center of gravity of the outboard motor 200 is reduced or minimized, and thus an increase in the weight of the outboard motor 200 is effectively significantly reduced or prevented.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the driving force transmission (shift force transmission) preferably includes three spur gears in each of the first and second preferred embodiments described above, the present invention is not restricted to this. In the present invention, the driving force transmission (shift force transmission) may alternatively include two or four or more spur gears. The number of spur gears is preferably odd.

While the shift force transmission is preferably disposed inside the upper case in each of the first and second preferred embodiments described above, the present invention is not restricted to this. In the present invention, the shift force transmission may alternatively be disposed inside the lower case.

While similarly to the shift shaft, the lower portion (second drive shaft) of the drive shaft is preferably located rearward in each of the first and second preferred embodiments described above, the present invention is not restricted to this. In the present invention, the drive shaft may alternatively extend linearly in the upward-downward direction.

While the shift force transmission is preferably disposed below the lower mounts in each of the first and second preferred embodiments described above, the present invention is not restricted to this. In the present invention, the shift force transmission may alternatively be disposed above the lower mounts. Furthermore, the shift force transmission may alternatively be disposed at the same height as the lower mounts.

While the shift force transmission (driving force transmission) preferably includes a plurality of spur gears in each of the first and second preferred embodiments described above, the present invention is not restricted to this. In the present invention, the shift force transmission (driving force transmission) may alternatively include a plurality of bevel gears, for example.

While components such as the electric motor and the water pump are preferably disposed forward on the extension of the central axis of the propeller shaft, respectively, in the first and second preferred embodiments described above, the present invention is not restricted to this. In the present invention, components such as the electric motor and the water pump may not be disposed forward on the extension of the central axis of the propeller shaft.

While when the slider moves forward such that the front bevel gear and the drive clutches of the slider mesh with each other, the marine vessel is preferably moved forward, and when the slider moves rearward such that the rear bevel gear and the drive clutches mesh with each other, the marine vessel is preferably moved rearward in each of the first and second preferred embodiments described above, the present invention is not restricted to this. In the present invention, when the slider moves forward such that the front bevel gear and the drive clutches mesh with each other, the marine vessel may alternatively be moved rearward, and when the slider moves rearward such that the rear bevel gear and the drive clutches mesh with each other, the marine vessel may alternatively be moved forward.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
    an engine;
    a drive shaft to transmit a driving force from the engine to a propeller shaft that rotates together with a propeller; and
    a shift shaft disposed forward of the drive shaft to switch a shift state of the outboard motor; wherein
    the shift shaft includes:
        a first shift shaft that extends in an upward-downward direction of the outboard motor;
        a second shift shaft disposed below the first shift shaft and spaced apart from and rearward of the first shift shaft, the second shift shaft extending in the upward-downward direction; and
        a shift force transmission to transmit, to the second shift shaft, a shift force applied to the first shift shaft;
    the drive shaft includes:
        a first drive shaft that extends in the upward-downward direction;
        a second drive shaft disposed below the first drive shaft and spaced apart from and rearward of the first drive shaft, the second drive shaft extending in the upward-downward direction; and
        a driving force transmission to transmit, to the second drive shaft, a driving force applied to the first drive shaft; and
    the shift force transmission is disposed directly below the driving force transmission.

2. The outboard motor according to claim 1, wherein a rearward separation distance of the second shift shaft from the first shift shaft is equal or substantially equal to a rearward separation distance of the second drive shaft from the first drive shaft.

3. The outboard motor according to claim 1, further comprising:
    a lower case that houses the propeller shaft; and
    an upper case disposed above the lower case; wherein
    the shift force transmission is disposed in a vicinity of a boundary between the upper case and the lower case so as to be exposed when the upper case is separated from the lower case.

4. The outboard motor according to claim 1, further comprising an electric motor to rotate the propeller instead of the engine; wherein
    the electric motor is disposed below the first shift shaft and forward of the second shift shaft on an extension of a central axis of the propeller shaft.

5. The outboard motor according to claim 4, wherein a rearward separation distance of the second shift shaft from the first shift shaft is larger than a length of the electric motor in a forward-rearward direction of the outboard motor.

6. The outboard motor according to claim 1, wherein
    at least one of the shift force transmission and the driving force transmission includes a plurality of spur gears aligned in a forward-rearward direction of the outboard motor; and
    the plurality of spur gears of at least one of the shift force transmission and the driving force transmission include an odd number of spur gears.

7. The outboard motor according to claim 1, wherein
    the shift force transmission includes a plurality of spur gears aligned in a forward-rearward direction of the outboard motor; and
    the plurality of spur gears include a plurality of sector gears in which teeth are only partially provided in a circumferential direction.

8. The outboard motor according to claim 1, further comprising a cylindrical steering shaft that extends in the upward-downward direction; wherein
    the first shift shaft is disposed inside the cylindrical steering shaft.

9. The outboard motor according to claim 1, further comprising a non-positive displacement water pump driven by the propeller shaft to pump seawater so as to cool the engine; wherein
the non-positive displacement water pump is disposed below the first shift shaft and forward of the second shift shaft on an extension of a central axis of the propeller shaft.

10. The outboard motor according to claim 9, wherein a rearward separation distance of the second shift shaft from the first shift shaft is larger than a length of the non-positive displacement water pump in a forward-rearward direction of the outboard motor.

11. The outboard motor according to claim 1, further comprising a lower mount that supports a lower portion of an outboard motor body; wherein
the shift force transmission is disposed below the lower mount.

12. The outboard motor according to claim 1, further comprising a lower mount that supports a lower portion of an outboard motor body; wherein
the driving force transmission is disposed below the lower mount.

13. The outboard motor according to claim 1, wherein
the first shift shaft is disposed forward of the first drive shaft in a forward-rearward direction of the outboard motor; and
the second shift shaft is disposed rearward of the first drive shaft in the forward-rearward direction.

14. The outboard motor according to claim 1, wherein a distance between the shift force transmission and the driving force transmission in the upward-downward direction is larger than a distance between the first shift shaft and the first drive shaft in a forward-rearward direction of the outboard motor.

15. A marine vessel comprising:
a hull; and
an outboard motor mounted on the hull; wherein
the outboard motor includes:
an engine;
a drive shaft to transmit a driving force from the engine to a propeller shaft that rotates together with a propeller; and
a shift shaft disposed forward of the drive shaft to switch a shift state of the outboard motor;
the shift shaft includes:
a first shift shaft that extends in an upward-downward direction of the outboard motor;
a second shift shaft disposed below the first shift shaft and spaced apart from and rearward of the first shift shaft, the second shift shaft extending in the upward-downward direction; and
a shift force transmission to transmit, to the second shift shaft, a shift force applied to the first shift shaft;
the drive shaft includes:
a first drive shaft that extends in the upward-downward direction;
a second drive shaft disposed below the first drive shaft and spaced apart from and rearward of the first drive shaft, the second drive shaft extending in the upward-downward direction; and
a driving force transmission to transmit, to the second drive shaft, a driving force applied to the first drive shaft; and
the shift force transmission is disposed directly below the driving force transmission.

16. The marine vessel according to claim 15, wherein a rearward separation distance of the second shift shaft from the first shift shaft is equal or substantially equal to a rearward separation distance of the second drive shaft from the first drive shaft.

* * * * *